United States Patent [19]
Cort et al.

[11] Patent Number: 5,958,237
[45] Date of Patent: Sep. 28, 1999

[54] FUEL FILTER AND WATER SEPARATOR APPARATUS WITH INTEGRATED FUEL PUMP

[75] Inventors: Alexis Cort, Columbus, Ind.; Zemin Jiang; Dwight S. Suiter, both of Cookeville, Tenn.

[73] Assignee: Cummins Engine Company, Inc., Columbus, Ind.

[21] Appl. No.: 09/026,214

[22] Filed: Feb. 19, 1997

[51] Int. Cl.$^6$ ............................ B01D 35/26; B01D 35/02; F02M 37/14; F02M 37/22
[52] U.S. Cl. ..................... 210/416.4; 210/184; 123/509; 123/514
[58] Field of Search ............................ 210/416.4, 416.1, 210/184, 85; 123/497, 509, 514

[56] References Cited

U.S. PATENT DOCUMENTS

| | | |
|---|---|---|
| 1,789,611 | 1/1931 | Van Ranst . |
| 3,610,416 | 10/1971 | Otte . |
| 4,331,537 | 5/1982 | Klauck . |
| 4,424,007 | 1/1984 | Mehrens et al. . |
| 4,617,116 | 10/1986 | Seiler . |
| 4,997,555 | 3/1991 | Church et al. . |
| 5,021,151 | 6/1991 | Yane . |
| 5,207,898 | 5/1993 | Hodgkins . |
| 5,231,967 | 8/1993 | Baltz . |
| 5,392,750 | 2/1995 | Laue et al. . |
| 5,511,957 | 4/1996 | Tuckey et al. . |
| 5,564,396 | 10/1996 | Kleppner et al. . |

*Primary Examiner*—Thomas M. Lithgow
*Attorney, Agent, or Firm*—Woodard, Emhardt, Naughton, Moriarty & McNett

[57] ABSTRACT

A fuel filter constructed and arranged for fuel-water separation which is designed with an integral fuel pump includes a unitary housing designed with a fuel filter cavity for receipt of a fuel filter cartridge, and a pump receptacle cavity for receipt of a fuel pump. A separating wall is disposed between the fuel filter cavity and the fuel pump cavity and this wall defines a flow passageway for fuel flow communication between the fuel pump and the fuel filter. Included as part of the fuel filter assembly is a lid designed to attach over the fuel filter cavity of the unitary housing and a lid designed to attach over the pump receptacle cavity of the unitary housing. The combining of the fuel filter cartridge and the cooperating fuel pump within the same unitary casting provides design efficiencies and economies.

21 Claims, 14 Drawing Sheets

FUEL FILTER AND WATER SEPARATOR APPARATUS WITH INTEGRATED FUEL PUMP

BACKGROUND OF THE INVENTION

The present invention relates in general to fuel filters which incorporate a water separation and collection feature in combination with a heater. More specifically the present invention relates to a fuel filter design which includes an integrated fuel pump and a variety of cooperating features. The combination of features provides a design which is convenient to use and to service and which is cost effective to manufacture.

Specifically, the present invention combines an upstream fuel pump as an integrally connected component so that less space is required and so that the connection interface is simplified. Diesel engines utilize a main fuel injection pump downstream from the fuel filter in order to increase the fuel pressure and deliver it to the fuel injectors. The majority of the delivered fuel though is not utilized by the injectors and passes directly to the main fuel tank. In drawing the fuel from the main fuel tank into the fuel filter, a fuel pump is used. The upstream fuel pump must be connected to the fuel tank by an inlet conduit and to the fuel filter by an outlet conduit. Space must be created on the engine for the fuel filter and provisions must be made for securely mounting the fuel filter in position. Additionally, provisions must be made for maintaining and servicing the leak-free connections and, with a separate fuel filter, additional labor is required for the positioning, mounting, and connecting of the fluid conduits. In order to simplify these requirements and provide a lower cost design of less weight which requires less space and is easier to service and maintain, the present invention was conceived.

While there are a number of fuel filter designs, some with heaters and some with a water separation capability, none provide the same structural configuration of the present invention which combines an integrated fuel pump into the fuel filter.

Diesel fuel tends to contain a relatively high level of impurities such as particulate matter and water as compared to the corresponding levels in other liquid hydrocarbon fuels. As a consequence, diesel fuel typically needs to be filtered before injecting the diesel fuel into the engine. The concern over the levels of particulate matter and water in the diesel fuel are significant due to the problems which can be caused. Particulate matter can clog fuel lines and fuel injectors and cause deposits to be formed in the combustion chamber. When water-laden diesel fuel is run through a fuel system and engine, the presence of water can cause the fuel injection system to malfunction due to rust, corrosion, deposits, etc. Excessive levels of water may lead to catastrophic injector nozzle failure due to the effects of steam expansion and/or lubricity effects.

In cold weather, diesel fuel becomes more viscous and, as a result, flows through the fuel system more slowly. Due to the presence of water in the diesel fuel, there is a higher probability of fuel line freeze. Even if the fuel does not freeze in the fuel line, the higher viscosity, due to the fuel gelling, will cause the fuel filter to restrict the flow. The problems of the fuel gelling and increased viscosity are complicated by having an increased amount of water in the fuel. If there is insufficient fuel reaching the combustion chamber, the engine will be starved and, as a result, will not start or will not run efficiently.

In order to address the issue of water-laden fuel and fuel viscosity in cold weather, fuel filters have been designed with water separation and collection arrangements and with heaters. In one arrangement, the water and other contaminants in the diesel fuel are collected on the outer surface of the filter medium and from there, drop to the bottom portion of the housing and are collected in a suitable collection bowl. In another arrangement, a centrifugal flow path is used to separate the higher density fluid (i.e., water and particulate matter) from the lower density fuel.

With regard to the addition of a heater, heater devices used in combination with diesel fuel filters have become accepted due to the successful results which have been achieved. Initially, the heaters were adapted to preexisting fuel filters, but now it has become common to incorporate the heater as an integral, although modular, part of the fuel filter package. The use of a heater achieves an efficient degree of heat transfer with the fuel.

While the enhancements of water separation and the addition of a heater are significant, a number of other considerations are introduced by these two enhancements. For example, what path should the fuel follow for proper heating of the fuel? What style of thermostat should be used and where should it be installed in order to control the temperature? What style of housing is preferred and what is the easiest way to install and replace the filter element? These are only some of the questions which need to be answered when designing a fuel filter with the water separation capability and with a heater. The specific style of heater is also a consideration as is the method of draining the collection bowl. Some of these considerations have been the subject of issued patents and are addressed in U.S. patent application, Ser. No. 08/742,631, which was filed Nov. 1, 1996 and is presently pending. Application Ser. No. 08/742, 631 is incorporated by reference for its disclosure of a fuel filter with a water-in-fuel separation feature and a heater.

Even with all of the design variations and features which have heretofore been invented, there are other improvements and enhancements which have not, prior to the present invention, either been offered as part of a fuel filter or combined with a number of other features and enhancements into one cooperating assembly.

SUMMARY OF THE INVENTION

A fuel filter constructed and arranged for fuel-water separation with an integral fuel pump according to one embodiment of the present invention comprises a unitary housing which is constructed and arranged with a hollow pump receptacle which is open at one end for receiving a cooperating fuel pump, a fuel filter cartridge disposed within the unitary housing for filtering incoming fuel, a lid constructed and arranged for attachment to the unitary housing for closing the unitary housing, a fuel pump positioned in the pump receptacle for the delivery of fuel to the fuel filter cartridge, and a pump receptacle lid constructed and arranged to attach to the pump receptacle for closing the pump receptacle.

One object of the present invention is to provide an improved fuel filter which is constructed and arranged for fuel-water separation and which includes an integral fuel pump.

Related objects and advantages of the present invention will be apparent from the following description.

DESCRIPTION OF THE PREFERRED EMBODIMENT

Figure 1:
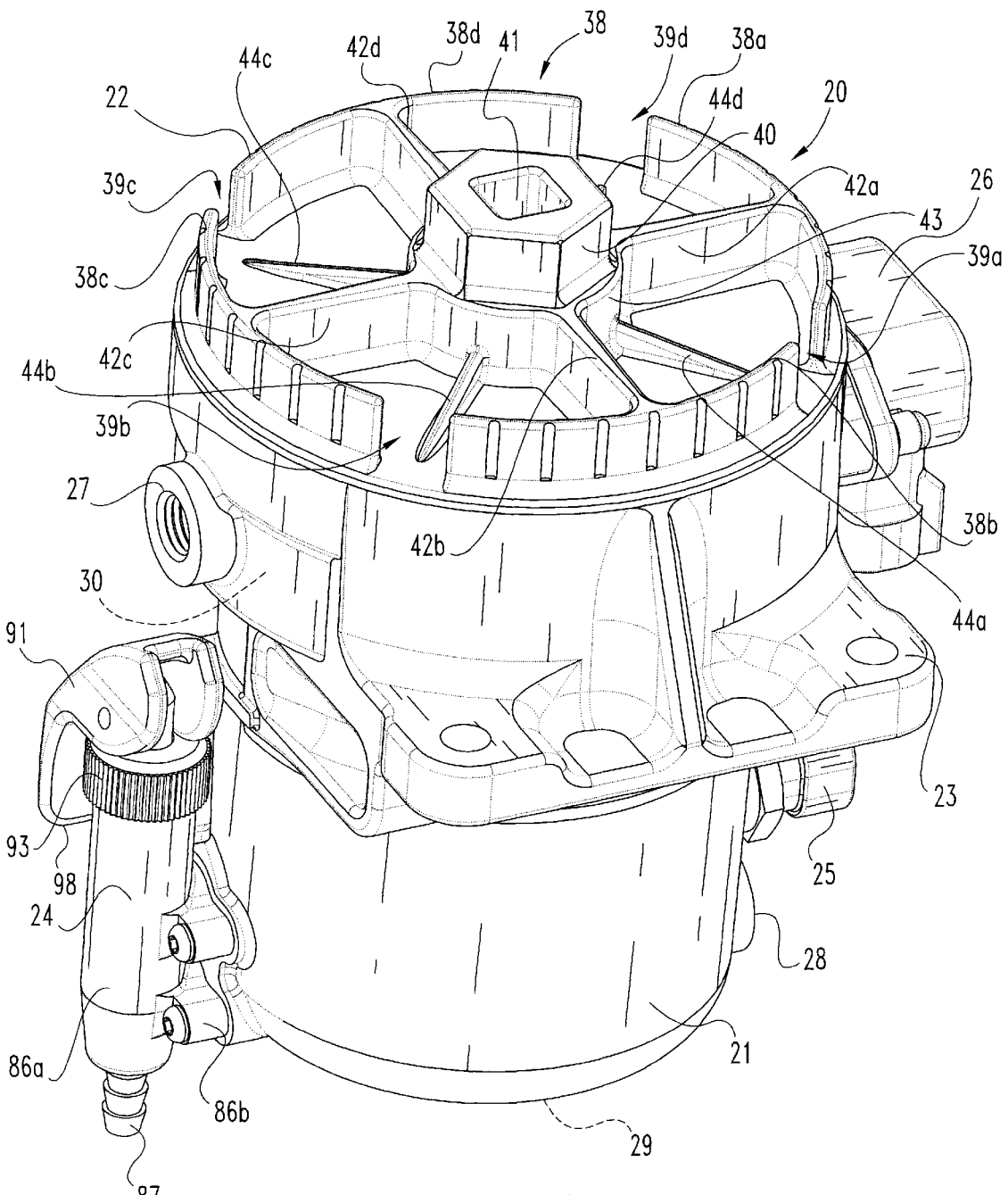
FIG. 1 is a perspective view of a prior art fuel filter.
Figure 2:
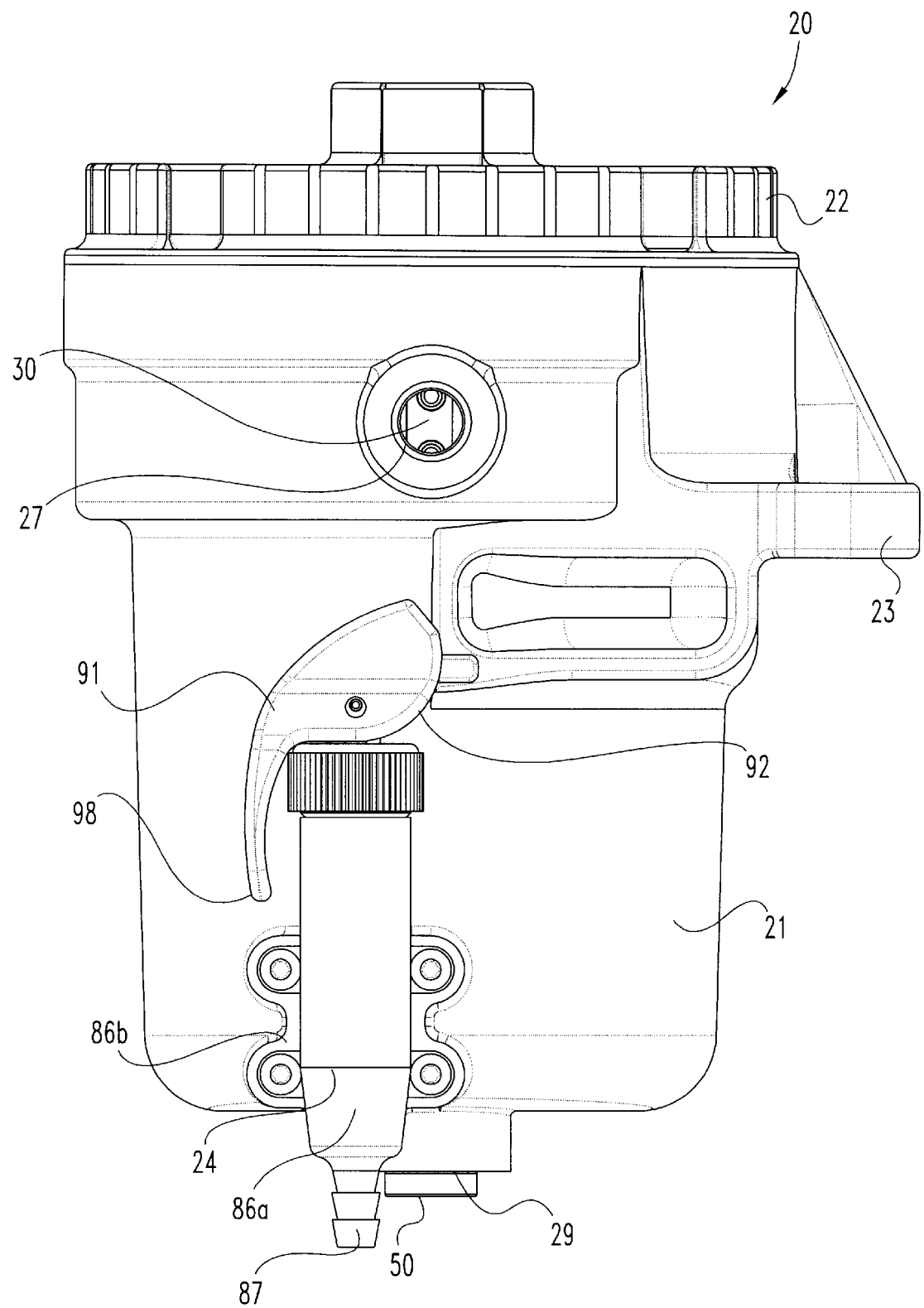
FIG. 2 is a front elevational view of the FIG. 1 prior art fuel filter.
Figure 3:
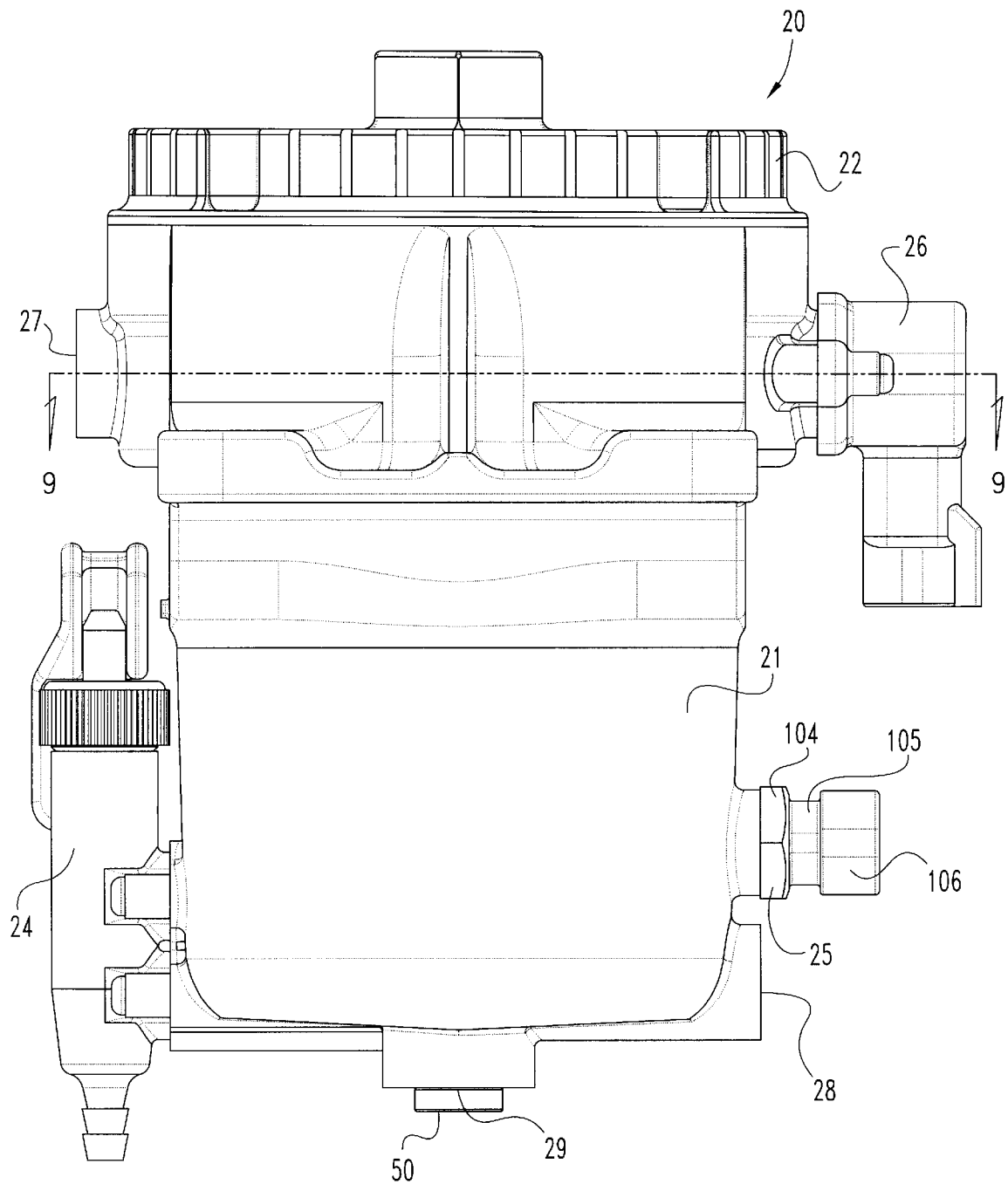
FIG. 3 is a right side elevational view of the FIG. 1 prior art fuel filter.
Figure 4:
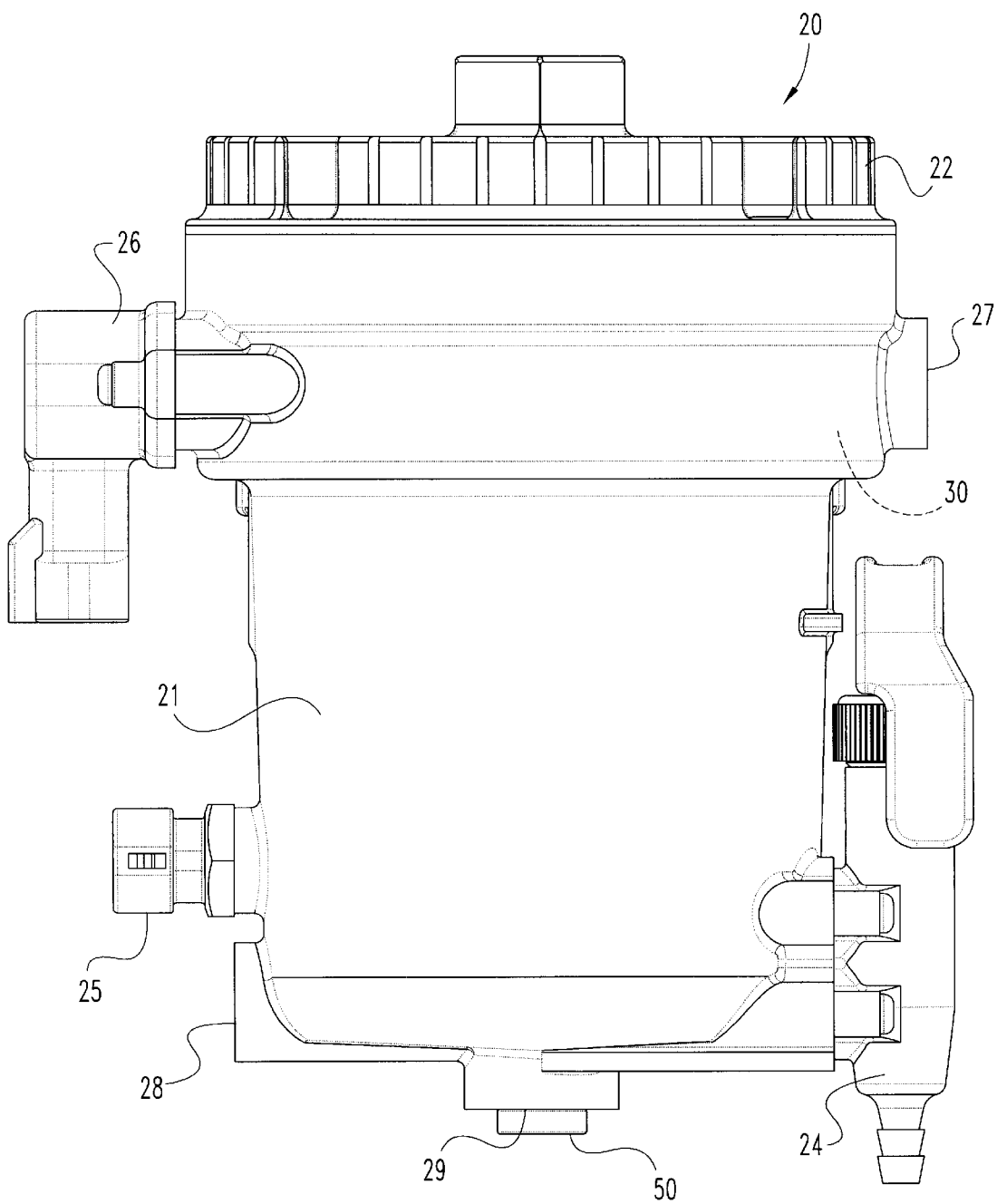
FIG. 4 is a left side elevational view of the prior art FIG. 1 fuel filter.
Figure 5:
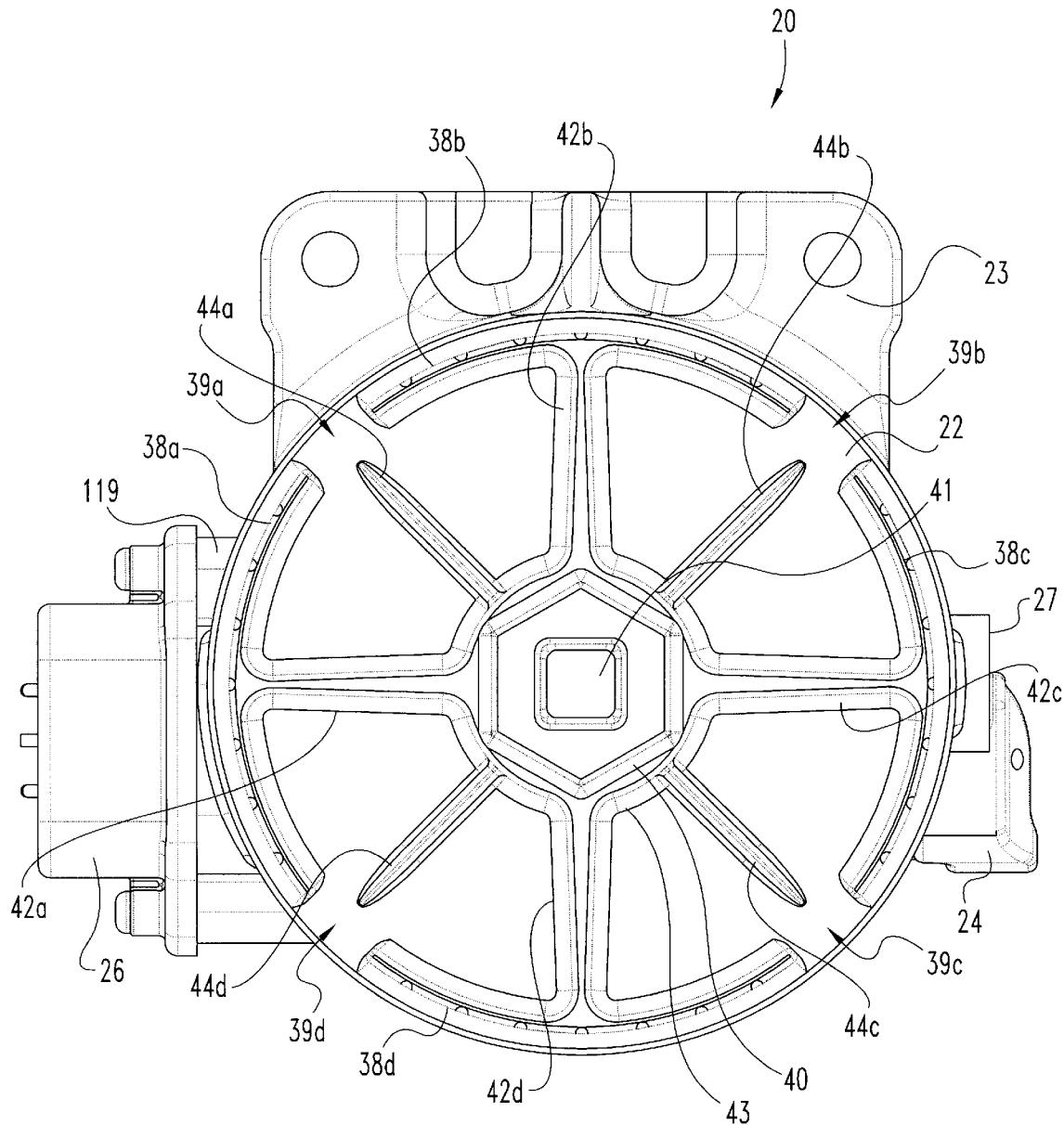
FIG. 5 is a top plan view of the FIG. 1 prior art fuel filter.
Figure 6:
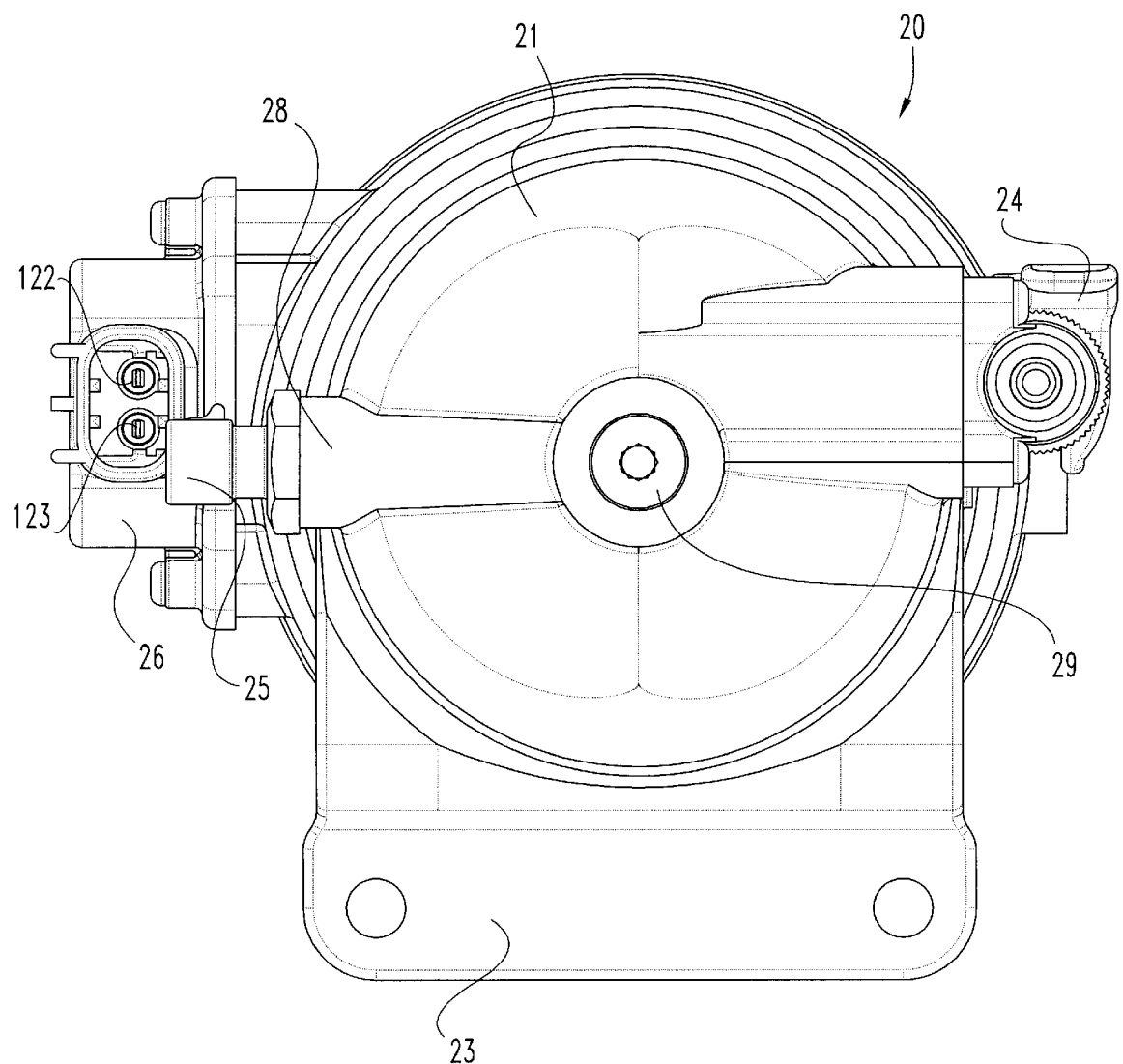
FIG. 6 is a bottom plan view of the FIG. 1 prior art fuel filter.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIGS. 1–9, a prior art fuel filter 20 is illustrated. Fuel filter 20 represents a predecessor design to the present invention and is disclosed herein as a way to illustrate and describe the basic components and functioning of a fuel filter with a water-in-fuel separation capability and with a heater. The inclusion of FIGS. 1–6 also provides a means to evaluate and compare the differences between the present invention and a predecessor fuel filter. These differences between the two designs are directed primarily to the configuration of the outer housing and the structural means of integrating a fuel pump into the outer housing in a cooperating manner with the remainder of the fuel filter. U.S. patent application Ser. No. 08/742,631, which is incorporated by reference herein, provides further details regarding the structure and operation of prior art fuel filter 20.

Figure 7:
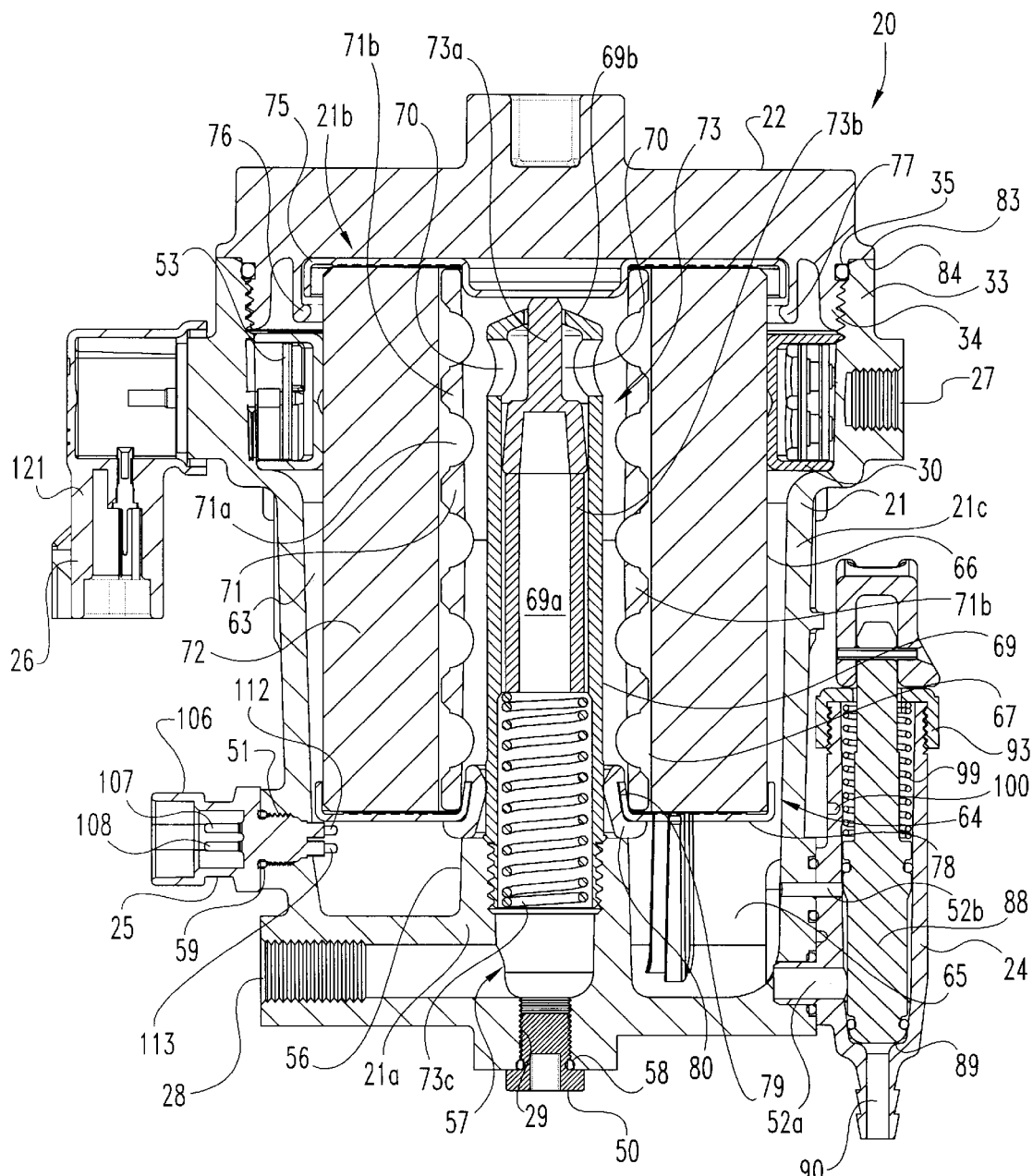
FIG. 7 is a left side elevational view in full section of the FIG. 1 prior art fuel filter.
Figure 8:
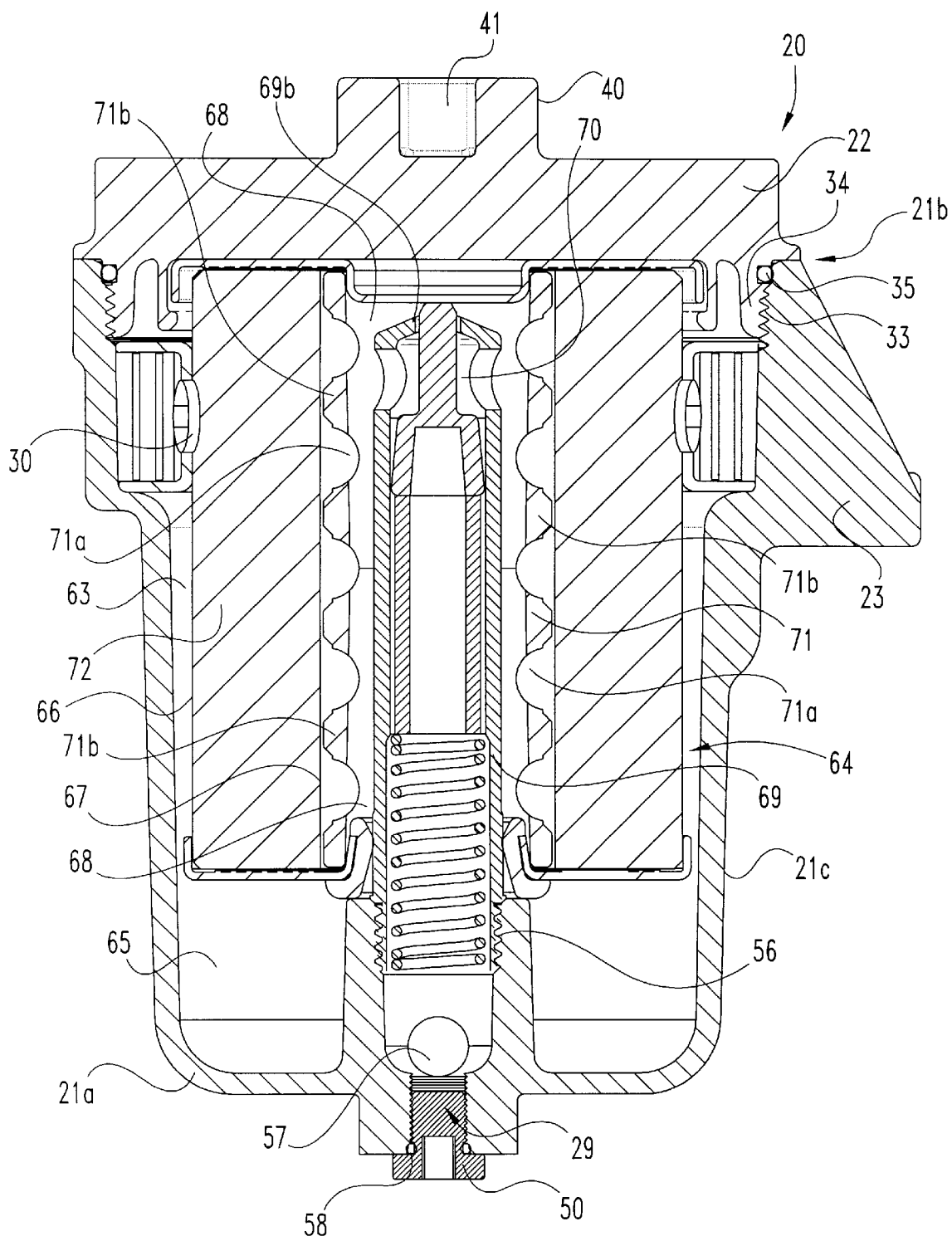
FIG. 8 is a diagrammatic, front elevational view in full section of the FIG. 1 prior art fuel filter.
Figure 9:
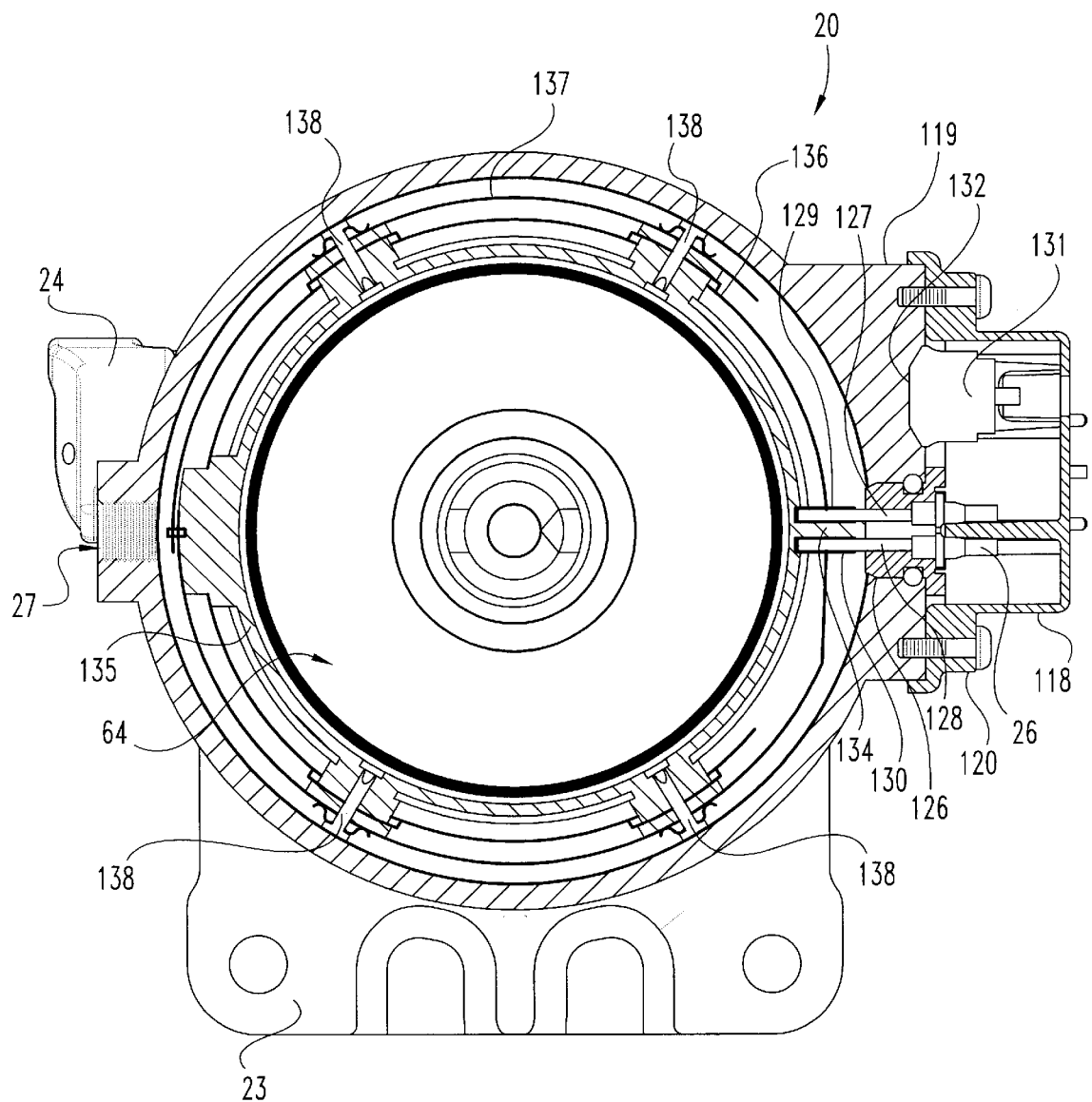
FIG. 9 is a top plan view in full section of the FIG. 1 prior art fuel filter as viewed along cutting plane line 9—9 in FIG. 3.
Figure 10:
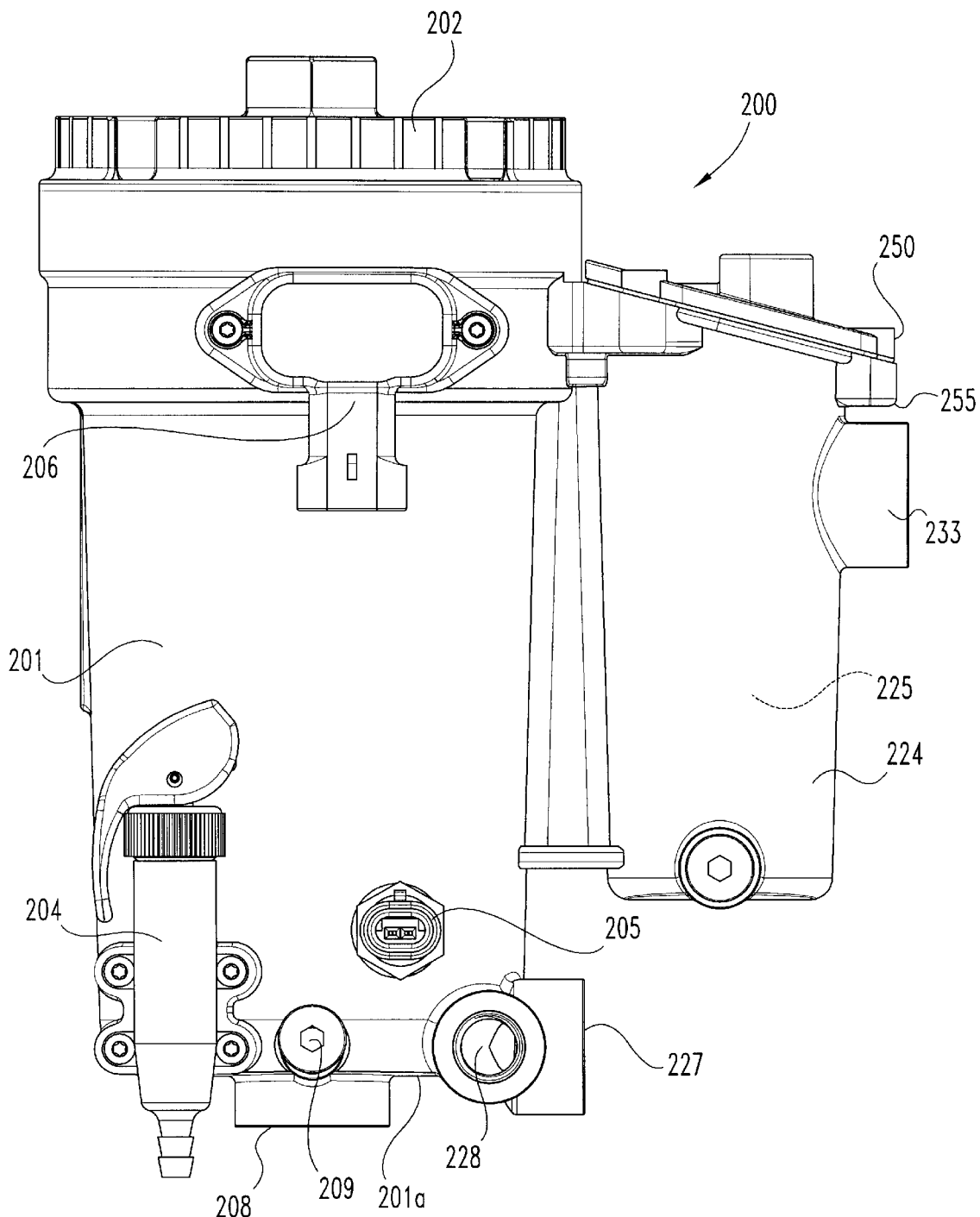
FIG. 10 is a front elevational view of a fuel filter with an integral fuel pump according to a typical embodiment of the present invention.

Continuing with reference to FIGS. 1–9, prior art fuel filter 20 includes a main housing 21, a lid 22, mounting bracket 23, drain valve 24, water-in-fuel (WIF) sensor 25, heater connector/thermostat assembly 26, fuel inlet 27, fuel outlet 28, downstream diagnostic port 29, and heater ring 30 (see FIG. 7). The orientation of fuel filter 20 in FIGS. 1–9 shall be used as a reference for the description which follows such that the filter has a "top" and a "bottom" as well as "upper" and "lower" directions. However, in actual use the fuel filter can be mounted by way of mounting bracket 23 in virtually any orientation. Nevertheless, the use of a water collection space at the bottom of the housing and a drain valve connected to that water collection space indicates that the preferred orientation for fuel filter 20, in actual use, is the orientation which is illustrated herein. As would be understood, and as mentioned above, diesel fuel often contains a higher proportion of water than other liquid hydrocarbon fuels. Accordingly, within the fuel filter it is desirable to route the fuel in such a manner so as to allow the water to separate out from the fuel which can be facilitated by a number of techniques which have been already mentioned. Due to the different densities, the water will tend to collect below the fuel and thus a water collection space at the bottom of the filter element provides a suitable area for water collection. Once the amount of water reaches a certain level, it would be appropriate to drain that area of the water and thus a drain is provided as well as a WIF sensor.

The upper edge 33 of housing 21 is internally threaded with a series of threads and the lower edge 34 of lid 22 is externally threaded with a series of cooperating threads (see FIG. 7). An O-ring 35 is positioned between the housing 21 and lid 22 above the cooperating threads in order to securely seal the interface between the housing and lid and prevent any fluid leakage. The lid 22 is designed to permit a number of different assembly and removal techniques and the use of various tools in order to assemble the lid into the housing and remove the lid from the housing. The upper, outer wall 38 of lid 22 is arranged into four part-cylindrical wall sections 38a–38d, each of which is separated from the adjacent wall section by a debris drain slot 39a–39d. The four wall sections 38a–38d are virtually identical and are equally spaced around the periphery of lid 22. The four drain slots 39a–39d are likewise equally spaced around the periphery of the lid. The center of lid 22 is configured with a hex post 40 which includes a recessed square drive socket 41 in the center of hex post 40. Each wall section 38a–38d is integrally connected to one of four, equally-spaced and cooperating long ribs 42a–42d, respectively, and each long rib connects to an inner, lower wall 43. Also connected to inner, lower wall 43 are four, equally-spaced short ribs 44a–44d. The centerline axis of each long rib 42a–42d is approximately 45 degrees from the centerline axis of each short rib 44a–44d.

The two sets of ribs can be used to manually thread the lid 22 into the housing 21 and, depending on the degree of tightening, manually remove the lid. Since the lid needs to be tightly assembled in order to be fluid-tight, the manual handling of the lid to either assemble or remove it is expected to be only part of the procedure. Manually the lid can be initially advanced and then securely tightened into final position by use of a hex socket wrench or by the use of a square drive wrench. The socket wrench or square drive wrench is then initially used to break the seal and, when the lid is loose enough by this means, its actual removal can be completed manually. The ribs can also be used in cooperation with a blunt tool driven by a mallet, to create a tight seal and/or to break the seal when the lid is to be removed.

The housing 21 is a unitary casting configured as a single member with integral mounting bracket 23. The mounting bracket 23 is cast as part of the housing, thereby providing not only a cost effective design but greater strength and rigidity. The housing 21 is also configured with a unitary, internally-threaded aperture for the fuel inlet 27, a unitary, internally-threaded aperture for the fuel outlet 28, an internally-threaded port 29 for receipt of a downstream diagnostic plug 50, an internally-threaded connection port 51 for the WIF sensor 25, a pair of connection ports 52a (inlet) and 52*b* (vent) for the drain valve 24, and a connection port 53 for the heater connector/thermostat assembly 26. The fuel inlet (port) 27 is located adjacent the open top end 21*b* of the housing so as to create an efficient fuel-water-separation path.

The interior of housing 21 (see FIGS. 7, 8, and 9) is arranged with a unitary, internally-threaded support stem 56 which is centered in the closed base 21*a* of the housing and extends upwardly into the hollow interior of the housing in the direction of the open end 21*b* of the housing which is ultimately closed by lid 22. Disposed between closed base 21*a* and open end 21*b* is a surrounding sidewall 21*c*. Sidewall 21*c* in cooperation with the closed base 21*a* defines the hollow interior of the housing 21. Stem 56 is substantially concentric with the downstream diagnostic port 29 and the interior of stem 56 is in flow communication with port 29. Outlet hole 57 is the inner opening of fuel outlet port 28. Diagnostic plug 50 is threaded into port 29 and is threaded into a liquid-tight position, assisted by O-ring 58. Removal of plug 50 allows a portion of the fuel to be drawn off and diagnosed. The draw off of fuel by way of port 29 enables a "downstream" fuel diagnosis as would be understood from the location of port 29 relative to the fuel outlet 28 as illustrated in the drawings. The WIF sensor 25 which provides an indication of the fluid conductivity in the water collection space also serves as a closing plug for the corresponding port in the housing. Sensor 25 is threaded into connection port 51 with a liquid-tight assembly, assisted by O-ring 59. In the event an upstream fuel diagnosis is desired, the WIF sensor 25 can be removed for this purpose. Consequently, a single connection port 51 is used for two functions. This technique eliminates the need to machine a second connection port to provide the upstream fuel diagnosis. Likewise, since the WIF sensor 25 is indirectly used as a liquid-tight plug for the connection port, no additional plug is required.

The flow of fuel into filter 20 begins with fuel entry by way of the fuel inlet (port) 27. As will be described in greater detail hereinafter, the heater ring 30 is positioned adjacent to the fuel inlet port 27. The design of the heater ring is such that the entering fuel must first work its way through and around the heater ring 30 before it is able to feed into the annular clearance space 63. Picking the description up from this point, the fuel which flows from the heater ring into the annular clearance space 63 then flows around the filter cartridge 64 and is allowed to pool in collection area or space 65. Water collection space 65 is adjacent to the closed base 21*a* and is in flow communication with drain valve 24. The fuel flows radially inwardly into and through the filter cartridge 64, entering from the outer wall 66 and exiting by way of the inner wall 67 into interior space 68. Inner wall 67 abuts up against rigid, substantially cylindrical centertube 71 for the filter cartridge 64 which includes a series of flow openings 71*a*. A permanent centertube 69 which is securely threaded into stem 56, is injection molded with a dome-like contour at its upper end 69*b*. This particular design is helpful in keeping dirty fuel out. Centertube 69 is hollow in order to serve as the flow conduit and has two fuel entrance apertures 70 which are located in the upper end of centertube 69. Fuel flowing through the filter element 72 of cartridge 64 and entering the interior space 68 flows into apertures 70 and by way of the hollow interior 69*a* of centertube 69, the fuel flows into stem 56 and from there out through fuel outlet (port) 28. Positioned within centertube 69 is a shut-off valve 73 which includes a plunger 73*a*, spacer sleeve 73*b*, and spring 73*c*. When a filter cartridge 64 is installed in housing 21, the central offset portion of the top plate 75 pushes down on the plunger so that it no longer blocks apertures 70, thereby allowing flow through the centertube. If a filter cartridge 64 is not installed, the biasing spring 73*c* pushes up on the plunger 73*a* whose two arcuate blocking portions are positioned so as to cover and close off the two flow apertures 70. This arrangement is effective to block the flow so that the engine cannot operate unless a filter cartridge is installed because the supply of fuel is cut off. In this way the engine is not permitted to receive unfiltered fluid. This particular capability is fully described and illustrated in U.S. patent application Ser. No. 08/897,334, which was filed on Jul. 21, 1997 and which is present pending. U.S. patent application Ser. No. 08/897,334 is hereby incorporated by reference for its disclosure of the shut off valve design and capability.

The substantially circular top plate 75 is securely bonded to and across the upper end of the filter element 72. Top plate or top endplate 75 seals over the upper end of the filter element in order to prevent the flow of any fuel out the end of the filter element 72. The center of top endplate 75 is solid so as to close off the hollow interior 68 and thereby prevent any bypass flow of fuel out the top end of centertube 71. Top endplate 75 is oversized in its outside diameter dimension in order to provide a retaining lip 76 for snap-fit assembly with an annular array of downwardly extending fingers 77 which are configured so as to simulate an inner wall of lid 22. This inner wall or array of downwardly extending fingers 77 are sized and arranged to snap around and over the underside retaining lip 76 as a means of holding the filter cartridge 64 to the lid 22 which in turn facilitates the assembly of the filter cartridge 64 into the main housing 21. The lower end of the filter cartridge 64 is arranged with a bottom endplate 78 which has an annular ring shape and which is bonded over and around the lower end of filter element 72. The use of bottom endplate 78 seals the end of filter element 72 so that there is no fuel flow leakage out the end of the filter element, thereby ensuring that all of the fuel entering the filter element 72 by way of the outer wall 66 will ultimately flow through the element (not out the ends) exiting into the interior space 68. Bottom endplate 78 is oversized on the inner edge 79 in order to create clearance for the inner wall 67 and centertube 71. This inner edge 79 receives an annular gasket 80. The annular gasket 80 is securely attached to edge 79 and is designed and constructed to seal against the outer surface of centertube 69 and against the upper annular edge of stem 56.

The assembly technique for filter cartridge 64 involves first snapping the lid 22 onto the top endplate 75 of the filter cartridge 64. This snap-fit assembly is achieved by pressing the individual snap-fit fingers 77 over and around the lower edge 76 of the top endplate. The filter cartridge 64 is preassembled at this point in the process. The permanent centertube 69 is also already securely threaded into position in stem 56. The lid 22 and filter cartridge 64 combination is then threaded into the main housing 21. As the lid is tightened into position, flange 83 on the lid 22 is drawn into abutment against the upper surface 84 of the main housing 21. The O-ring 35 completes the sealed interface. The abutment of flange 83 onto surface 84 helps to control the degree of engagement and the degree of compression of annular, elastomeric gasket 80 which is attached to and around the inside diameter edge of bottom plate 78.

The drain valve 24 includes a main body 86*a* and mounting bracket 86*b* combination with an integral (unitary) drain valve barb 87 at the lower end. A spring-biased plunger 88 is disposed in the main body 86*a* and is designed to seal against the lower end 89 which is adjacent the drain outlet 90 extending through the drain valve barb 87. Handle 91 is pinned to the upper end of the plunger 88. Handle 91 includes a cam surface 92 which acts against the top of threaded cap 93 in order to lift the plunger and open an exit path through the drain outlet 90. The geometry of the cam surface 92 on handle 91 is such that when fully rotated into a valve-open condition, will actually pass over center and can effectively lock in that position, thereby simplifying the draining process.

As has been previously described, the higher density water collects below the fuel in collection space 65. When the water level is relatively low, there is no urgency nor any real need at that point to drain the water from the filter housing. In this condition, the two contacts of the WIF sensor will contact fuel and will have a particular conductivity reading. As the water level increases to the point that water bridges the connection between the two contacts of the WIF sensor, a different conductivity reading will be provided. This alerts the operator to the fact that it is advisable to drain the water from the collection space 65. The draining procedure is easy because the handle 91 is accessible from the top of the filter and can be easily lifted and maintained in that position until manually returned, assisted by the biasing spring. Four mounting screws attach the mounting bracket 86b to the main housing by means of internally-threaded bores in the body of the housing. Flow communication between the collection area 65 and the drain valve 24 is established by two passages which communicate with connection ports 52a and 52b and are initially closed off by the position of plunger 88. When the lever end 98 of handle 91 is lifted up, the plunger is raised, (i.e., retracted) and the spring 99 is compressed. This raises the plunger a distance which is sufficient for the end of the plunger to clear the lower passage and permit the liquid contained in the collection area to be drained by way of the drain outlet 90. The upper passage provides an entrance permitting air to enter the collection area 65. Bore 100 in the main body 86a provides an air inlet for air to enter the drain valve. Various O-rings are provided in order to seal the interface between the drain valve 24 and the main housing 21 and to seal the movement of the plunger 88 on the interior of the main body 86a of the drain valve.

The water-in-fuel (WIF) sensor 25 is basically a connector which has a hex flange 104, an undercut portion 105, and a receptacle 106 which houses two contact terminals 107 and 108. The portion of the sensor 25 which is threaded into housing bore 51 includes two contacts 112 and 113 which are effectively an extension of contact terminals 107 and 108, respectively. As water gradually collects in collection space 65, it will displace the fuel. Over time, the volume of water will increase to the point that the water level comes in contact with contacts 112 and 113, providing an indication of the conductivity. Electrically, this level of conductivity is sensed and monitored. When the electrical bridge between contacts 112 and 113 is made by water in lieu of fuel, the change in conductivity provides a signal to the vehicle operator, indicating that it is time to drain the collection space 65 of water by means of drain valve 24.

The heater connector/thermostat assembly 26 includes a housing 118 which is mounted to the main housing 21 by two mounting screws. The main housing is formed with a raised, oblong portion 119 which is open into the interior of the main housing 21. Each side of this oblong portion 119 includes an internally-threaded bore which receives one of the two mounting screws. The housing 118 includes a control portion 120 and a connector portion. The connector portion includes two contact terminals 122 and 123 which establish the electrical connection between the heater connector/thermostat assembly 26 and an external source of power, typically a 12 volt supply.

Within the control portion 120 there is a connector plug 126 which abuts up against the oblong portion 119. Plug 126 includes two electrical contacts 127 and 128 which are inserted into receiving sockets 129 and 130, respectively, which are part of heater ring 30 (see FIG. 9). Also positioned in portion 120 and wired in series with contact terminals 122 and 123 and with electrical contacts 127 and 128, is a thermostat 131. The thermostat 131 includes a metal cap 132 which is placed in direct contact with a machined surface (circular) in the oblong portion 119. This contact with the main housing 21 provides temperature feedback to the thermostat as to the temperature of the filter housing in the vicinity of the heater ring 30. A temperature in excess of the set limit for the thermostat causes the thermostat to open, thereby creating an open circuit and shutting off the delivery of power to the heater ring 30.

The heater ring 30 receives its electrical power from the heater connector/thermostat assembly 26 by way of the two electrical sockets 129 and 130. An annular plastic spool 135 provides the support member for the heater ring. Wrapped around the spool are two metal (heat conductive) bands 136 and 137. There is an inner metal band 136 in electrical contact with one socket 129. This inner band extends around the inner hub of the spool 135 for approximately 300 degrees. The outer metal band 137 is in electrical contact with the other socket 130 and extends around the spool for approximately 300 degrees. The two sockets 129 and 130 are spaced apart from each other by an insulative divider 134.

The two metal bands are spaced apart at four locations by positive-temperature-coefficient (PTC) heater stones 138. The arrangement of the two metal bands relative to each other and relative to the plastic spool causes the entering fluid to flow through a circulate maze such that the fuel flows across the PTC stones 138 twice.

With the foregoing as background to the present invention, reference is now made to FIGS. 10–14 which illustrate a fuel filter 200 designed according to the preferred embodiment of the present invention. Fuel filter 200 includes a main housing 201, a lid 202, mounting bracket 203, drain valve 204, water-in-fuel (WIF) sensor 205, heater connector/thermostat 206, fuel outlet 208, downstream diagnostic port 209, and heater ring 210. These components are each designed and function in a manner which is similar to their corresponding counterpart components in the prior art embodiment of FIGS. 1–9.

Positioned within the hollow interior of the main housing 201 is a filter cartridge 213 which is designed and which functions in a manner which is substantially identical to filter cartridge 64. As such, filter cartridge 213 includes centertube 214, filter element 215, top endplate 216 which is bonded to one end of the filter element, and bottom endplate 217 which is bonded to the other (opposite) end of the filter element. A permanent centertube 220 is securely threaded into stem 221 and includes a spring-biased shut-off valve 222. Centertube 220 is designed in a manner virtually identical to centertube 69 and valve 222 functions substantially the same as shut-off valve 73.

As will be noted by a careful comparison between FIGS. 1–9 and FIGS. 10–14, the relative positions of the primary exterior and, in some cases interior, components have been changed for the present invention over that of the prior art filter. This has been done in order to provide space on the exterior of main housing 201. In the prior art design of fuel filter 20, the fuel inlet 27 and drain valve 24 are on the same side of the main housing 21. The heater connector/thermostat 26, WIF sensor 25, and fuel outlet 28 are located along the same side of the main housing centered approximately 180 degrees from the fuel inlet and drain valve. The mounting bracket 23 is positioned approximately midway (circumferentially) between these two sets of components. The downstream diagnostic port 29 is substantially centered in the closed end (base) of the main housing.

In contrast, the fuel filter of the present invention is designed with the heater connector/thermostat 206, WIF sensor 205, and drain valve 204 generally on one side of the main housing 201. The drain valve 204 and WIF sensor 205 are located near the closed end 201a of the housing which is distal to the lid 202 while the heater connector/thermostat 206 is adjacent the lid. The drain valve 204 and WIF sensor 205 are spaced apart from each other while the diagnostic port 209 is positioned therebetween. Moving around the exterior of the main housing 201 from these components, approximately 180 degrees to the opposite side, the location for mounting bracket 203 is established (see FIG. 12).

Located approximately midway (circumferentially) between the mounting bracket 203 and the heater connector/thermostat 206 is a fuel pump receptacle 224 which is unitarily cast with the main housing 201. Operably assembled into the hollow interior of receptacle 224 is a fuel pump 225 which is in effect integrally connected with the fuel filter in view of the unitary construction between receptacle 224 and main housing 201. One unique aspect of the present invention is this integral mounting configuration created by the design and configuration of the unitary casting which forms and provides the structural configuration, not only for the main housing, but also for the fuel pump receptacle. It is also to be noted that main housing 201 has been formed (cast) as a unitary member with the requisite internal as well as external features and configurations which are constructed and arranged to receive the various components provided as part of the overall fuel filter 200. Likewise, receptacle 224 has been formed (cast) with the requisite internal as well as external features and configurations which are required in order for the receptacle to receive a suitable and cooperating fuel pump. The unitary casting configuration which provides the main housing 201 and the receptacle 224 includes three return fuel ports 226, 227, and 228. These three fuel ports are positioned generally adjacent the WIF sensor 205 and the fuel pump 225, substantially at the end 201a of the main housing 201 which is distal to the lid 202.

In the delivery of fuel from the main fuel tank to the injectors of the diesel engine, the first step is to draw fuel into the fuel filter which is upstream from the injectors. Once filtered, the fuel, exiting via outlet 208, goes to the main fuel injection pump. This pump increases the pressure of the fuel for delivery to the injectors. The injectors only utilize a small percentage of the cycling fuel and the excess returns to fuel filter 200 which is integrally connected to and includes fuel pump 225. The excess fuel from the fuel injection pump goes into port 226 while the excess fuel from the injectors goes into port 228. This inputted fuel flow is combined and exits fuel filter 200 via port 227. The fuel leaving port 227 goes to the primary or main fuel tank. By integrating fuel pump 225 as part of the fuel filter 200, space is conserved, the total weight is less, the fuel connections are fewer and are easier to make and maintain, and the overall cost in parts and assembly time is less. The unitary casting of the present invention which provides the main housing as well as the receptacle 224 further contributes to the overall design efficiencies and compactness by the providing of the three fuel ports. By integrating return fuel ports 226 and 227 into the unitary casting, connections in and around the vehicle engine are simplified and the need for any separate connections or equipment is eliminated.

Figure 11:
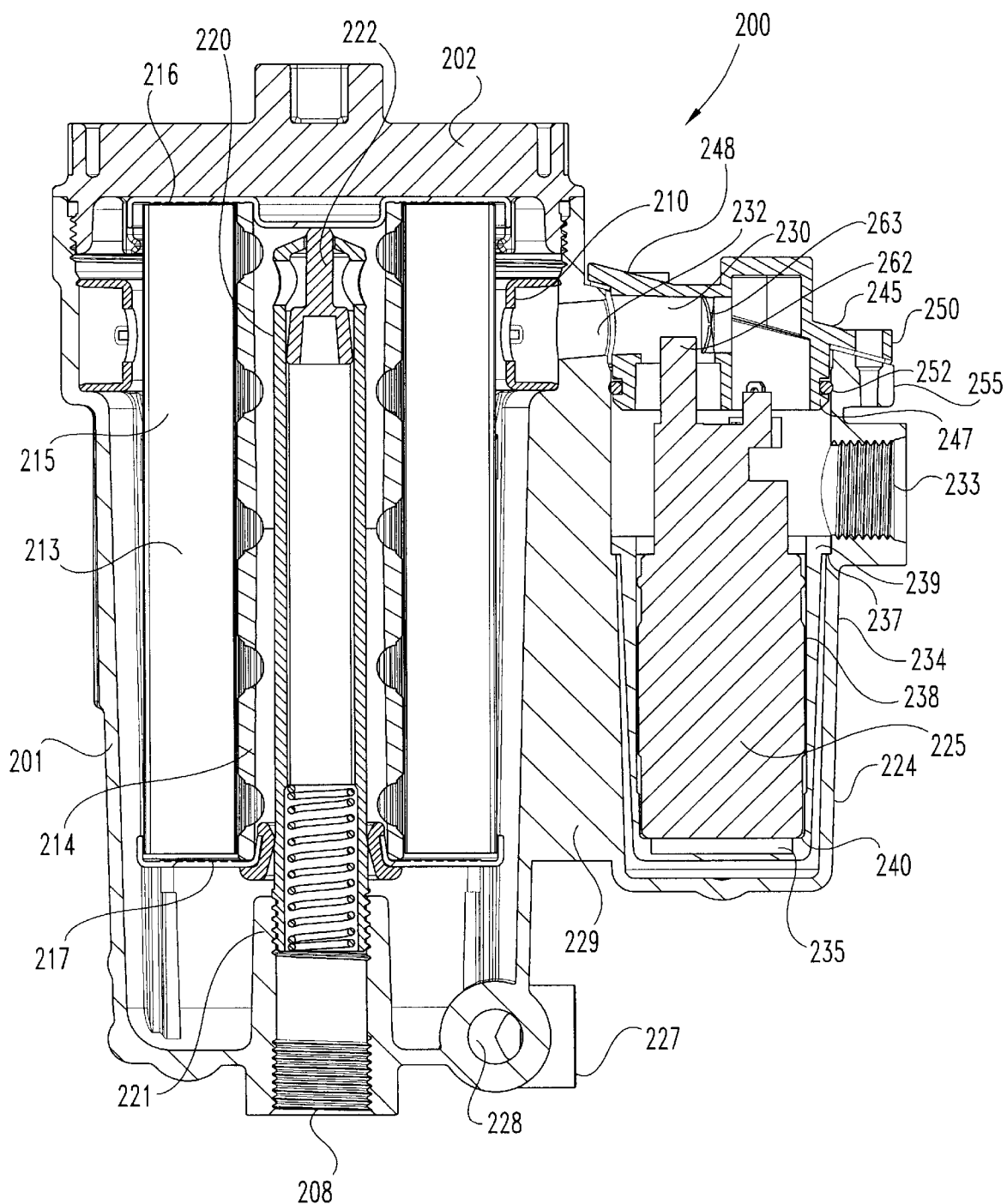
FIG. 11 is a front elevational view in full section of the FIG. 10 fuel filter.
Figure 12:
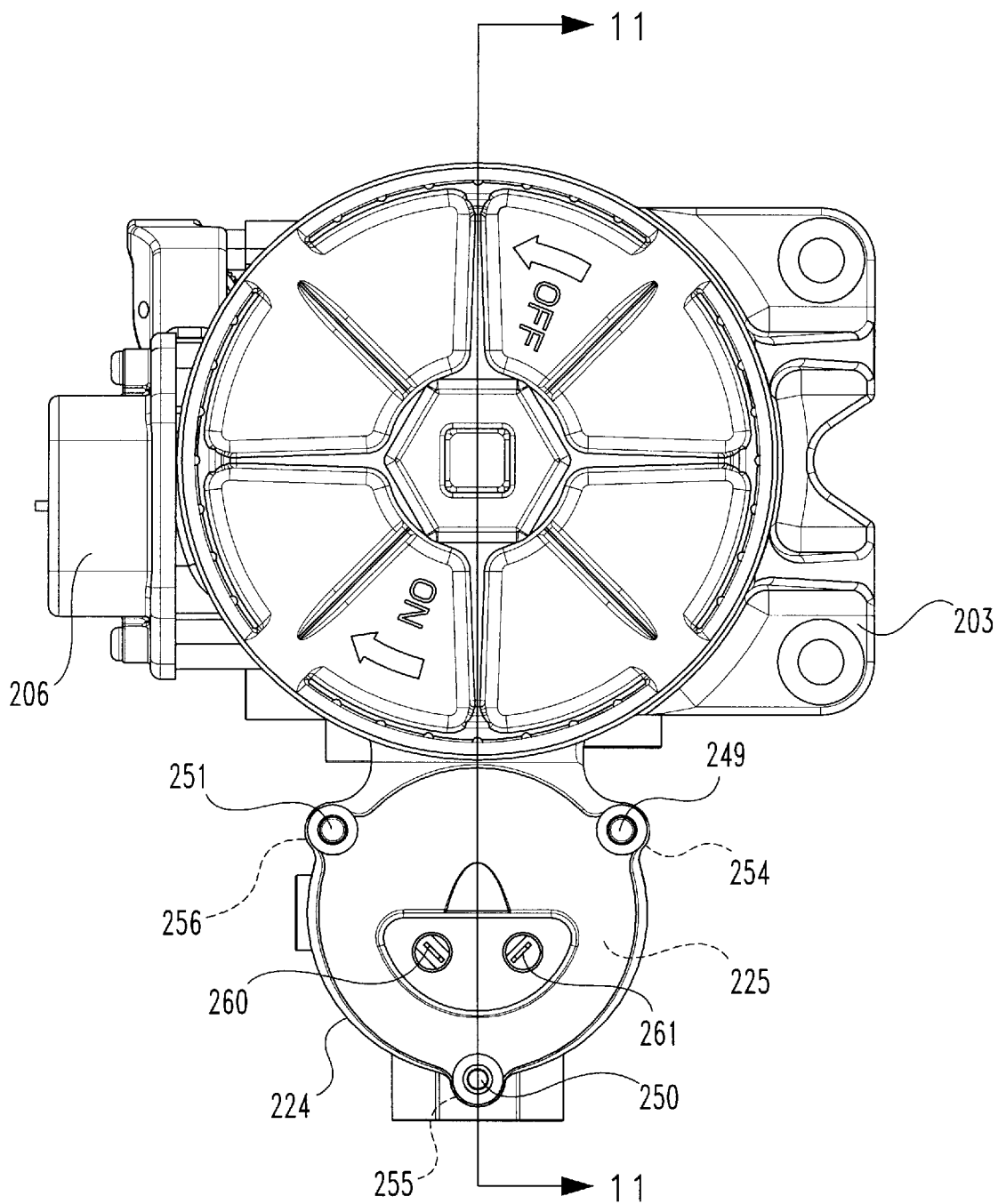
FIG. 12 is a top plan view of the FIG. 10 fuel filter including cutting plane line 11—11 for the FIG. 11 illustration.
Figure 13:
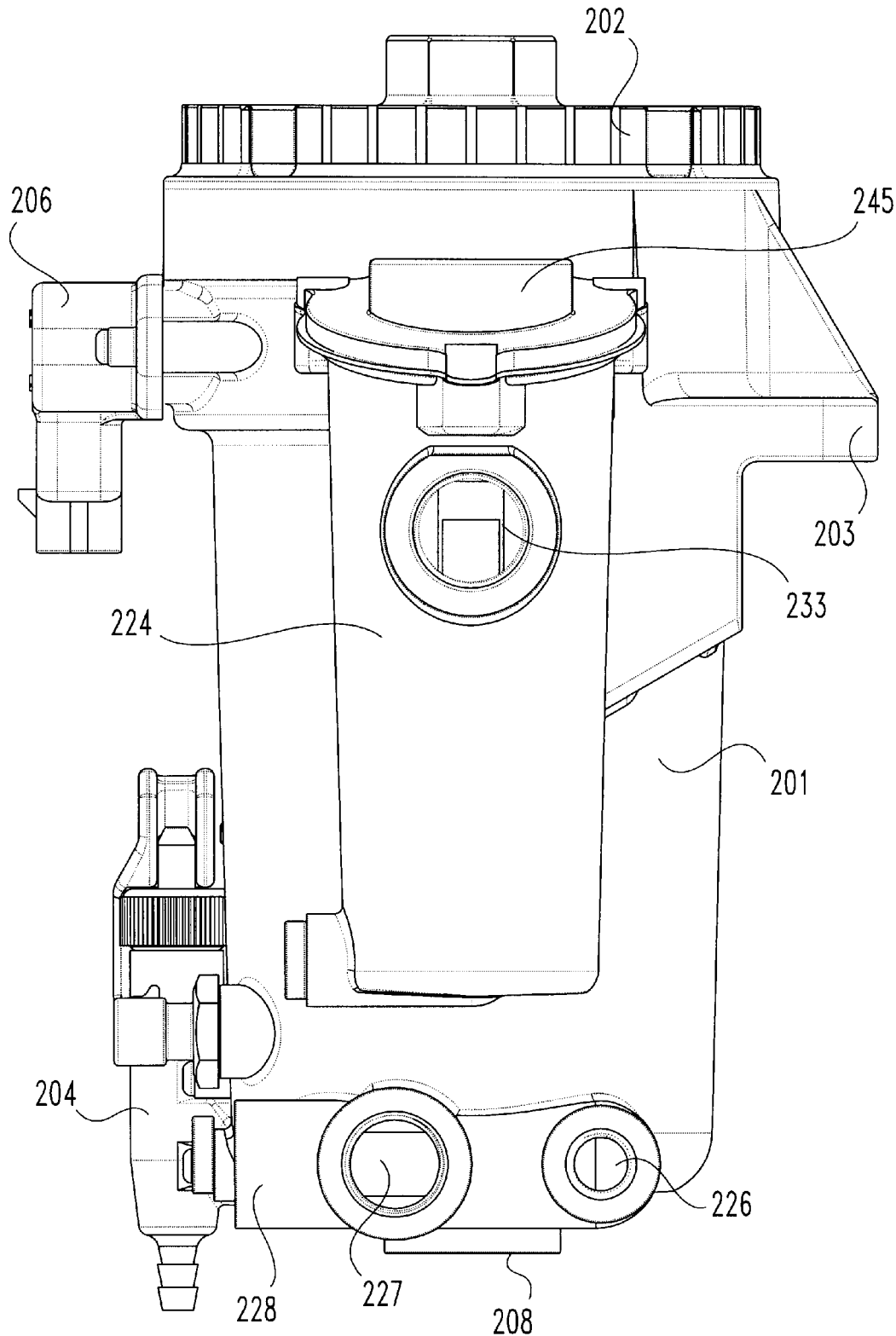
FIG. 13 is a right side elevational view of the FIG. 10 fuel filter.
Figure 14:
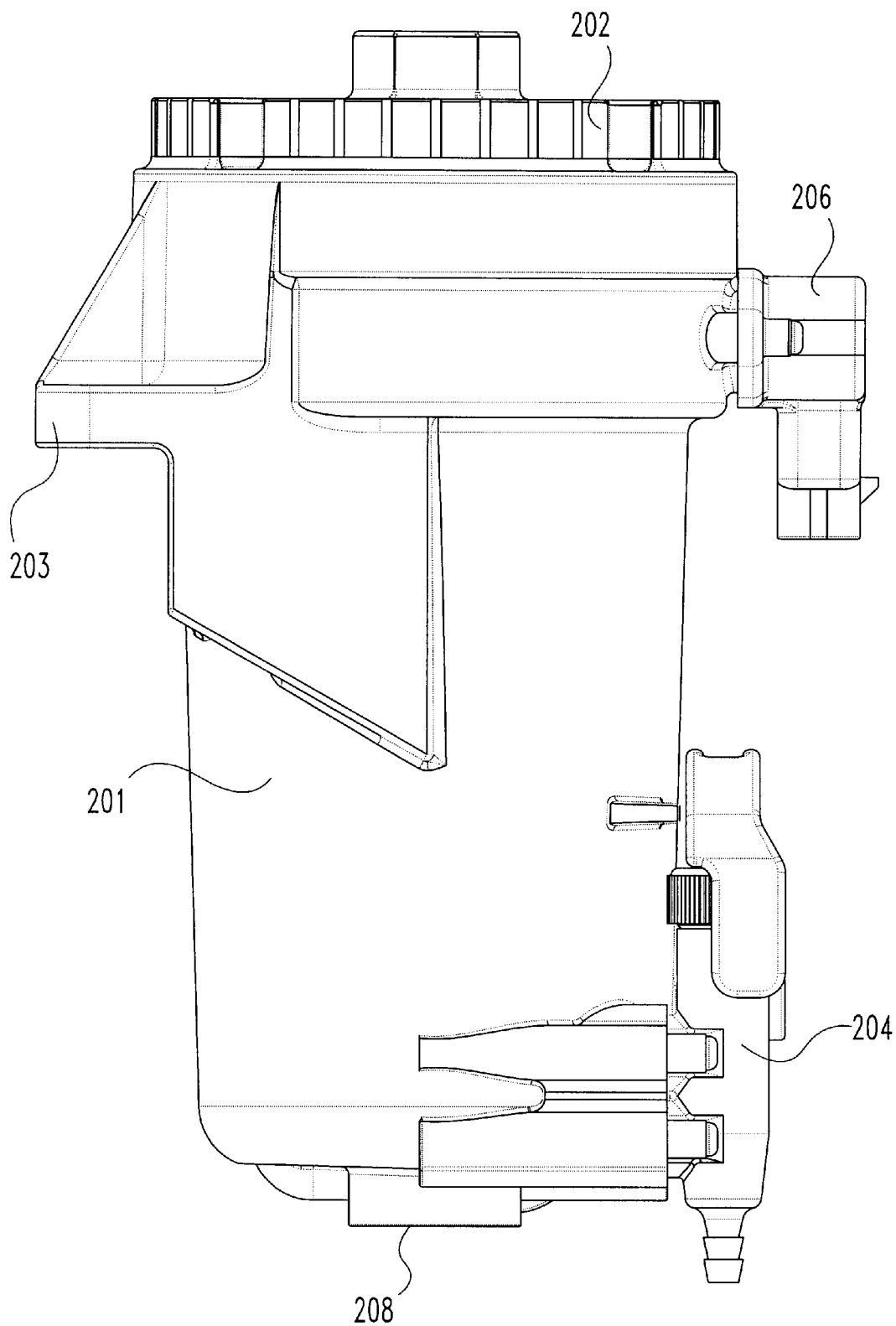
FIG. 14 is a left side elevational view of the FIG. 10 fuel filter.

With reference primarily to FIG. 11 and more generally to FIGS. 10, 12, 13, and 14, the details of unitary main housing 201 are illustrated. Main housing 201 includes, in addition to fuel outlet 208, diagnostic port 209, closed end 201a, the three fuel return ports 226, 227, 228, and the mounting interface for fuel pump 225. The mounting interface for fuel pump 225 involves a casting modification to the prior art main housing 21. The portion of the prior art casting wall (see FIG. 7) of housing 21 which extends along the drain valve 24 and upwardly to the fuel inlet is built up and out in order to create mounting interface 229 and the unitarily cast receptacle 224. As illustrated in FIG. 11, this mounting interface connects the cast receptacle 224 with the remainder of the main housing 201 into a single, unitary member. Included as part of the mounting interface is a cast passageway 232 which connects the pump passageway 230 of receptacle 224 with the inlet to the heater ring 30. In effect, passageway 232 replaces the internally-threaded fuel inlet 27. The "new" internally-threaded fuel inlet 233 is located in the outer wall 234 of the cast receptacle 224. The entering fuel is allowed to collect in the hollow interior 235 of receptacle 224 and is subsequently delivered by pump 225 to pump passageway 230 and from there into passageway 232.

Receptacle 224 includes an offset ledge 237 which receives a mesh screen filter basket 238. This basket 238 functions as a strainer in order to block the flow of larger particles that might be in the fuel. The upper flange 239 of the filter basket 238 rests on ledge 237 and supports the remainder of the basket 238. Seated within basket 238 is pump 225 which rests on the lower, inwardly directed lip 240 of basket 238. The mesh screen construction of filter basket 238 has sufficient stiffness in order to maintain its desired shape while still supporting the weight of pump 225 and thus no other support structures or features are required for this purpose.

Lid 245 completes the assembly configuration required for integrating pump 225 into the remainder of fuel filter 200. Lid 245 includes an insert portion 247, upper wall 248, bolt-receiving bosses 249–251, and O-ring seal 252. The three clearance bosses 249–251 each line up with one of three internally-threaded bosses 254–256 which are cast in unitary construction as part of receptacle 224. For the assembly of the pump 225 into receptacle 224, the three bolts connecting bosses 249–251 with bosses 254–256 are removed, the lid 245 is lifted off and a pump 225 is pushed into basket 238. Once the pump 225 is fully seated, the lid 245 is replaced. Insert portion 247 aligns itself within the receptacle 224 and the O-ring seal 252 establishes a fluid-tight interface between the lid and the remainder of receptacle 224. The three bolts are then inserted and tightened so as to clamp the lid 245 onto receptacle 224. The fuel conduit line is then connected to the fuel inlet 233 and the pump is ready for operation.

A suitable pump 225 for use as part of the present invention and in cooperation with fluid filter 200 is a model P61208S electric fuel pump assembly offered by Federal-Mogul Corporation, Lighting and Fuel Systems Product Development Center of Logansport, Ind. This style of pump is electrically operated and power is delivered by a wiring harness (not illustrated) with a positive plug-in terminal and a negative plug-in terminal. These two terminals plug into electrical sockets 260 and 261 for the electrical operation of pump 225. Electrical sockets 260 and 261 are part of the lid. Strained fuel is drawn in at the bottom of the pump 225 and is discharged at outlet tube 262 into pump passageway 230. Adjacent outlet tube 262 is a check valve 263 which opens at high pressure in order to recirculate a portion of the fuel and thereby reduce the fuel pressure at the outlet tube 262. By means of check valve 263, the overall assembly is guarded against fuel at too high of a pressure being delivered into the filter cavity. The pressure level at which the check valve 263 releases in order to recirculate a portion of the fuel and reduce the fuel pressure may be selectively preset by design and selection of the spring which comprises one portion of check valve 263.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A fuel filter constructed and arranged for fuel-water separation, said fuel filter comprising:

a unitary formed combination of a main housing and a fuel pump receptacle, said main housing having an open top and a closed base and defining a hollow interior filter space, said fuel pump receptacle being open at one end and defining a hollow interior pump space, said unitary formed combination including a partitioning sidewall positioned between said main housing and said fuel pump receptacle and defining a flow passageway which connects said pump space with said filter space;

a fuel filter cartridge disposed in said filter space, said fuel filter cartridge including a filter element;

a filter space lid being free of any flow line connections thereto and being constructed and arranged for attachment to said main housing for closing said open top and enclosing said filter space;

a fuel pump positioned in said pump space for the delivery of fuel to said fuel filter cartridge by way of said flow passageway; and a pump space lid constructed and arranged for attachment to said fuel pump receptacle for closing the open end of said fuel pump receptacle.

2. The fuel filter of claim 1 wherein said unitary formed combination is a casting.

3. The fuel filter of claim 2 wherein the pump receptacle includes a fuel inlet.

4. The fuel filter of claim 3 which further includes a wire mesh filter positioned between said fuel pump receptacle and said fuel pump.

5. The fuel filter of claim 4 which further includes a bolt connection of the pump space lid.

6. The fuel filter of claim 5 wherein said fuel pump is an electrically-operated pump and said pump space lid includes electrical sockets for connecting a source of incoming power to said fuel pump.

7. The fuel filter of claim 1 which further includes a wire mesh filter positioned between said fuel pump receptacle and said fuel pump.

8. The fuel filter of claim 1 wherein said fuel pump is an electrically-operated pump and said pump space lid includes electrical sockets for connecting a source of incoming power to said fuel pump.

9. A fuel filter assembly comprising:

a unitary formed combination of a main housing and a fuel pump receptacle, said main housing having an open top and a closed base and defining a hollow interior filter space, said fuel pump receptacle being open at one end and defining a hollow interior pump space, said unitary formed combination including a partitioning sidewall positioned between said main housing and said fuel pump receptacle and defining a flow passageway which connects said pump space with said filter space;

a fuel filter disposed in said filter space;

a filter space lid being free of any flow line connections thereto and being constructed and arranged for attachment to said main housing for closing said open top and enclosing said filter space;

a fuel pump positioned in said pump space for the delivery of fuel to said fuel filter by way of said flow passageway; and a pump space lid constructed and arranged for attachment to said fuel pump receptacle for closing the open end of said fuel pump receptacle.

10. The fuel filter assembly of claim 9 wherein the pump receptacle includes a fuel inlet.

11. The fuel filter assembly of claim 10 which further includes a wire mesh filter positioned between said fuel pump receptacle and said fuel pump.

12. The fuel filter assembly of claim 11 wherein said fuel pump is an electrically-operated pump and said pump space lid includes electrical sockets for connecting a source of incoming power to said fuel pump.

13. The fuel filter assembly of claim 9 which further includes a wire mesh filter positioned between said fuel pump receptacle and said fuel pump.

14. The fuel filter assembly of claim 9 wherein said fuel pump is an electrically-operated pump and said pump space lid includes electrical sockets for connecting a source of incoming power to said fuel pump.

15. A fuel filter housing for receipt of a fuel filter and a fuel pump comprises:

a unitary formed combination of a main housing and a fuel pump receptacle in side by side relationship, said main housing having an open top and being adapted to receive a main housing lid and a closed base and defining a hollow interior filter space, said closed base defining a flow outlet, said fuel pump receptacle being open at one end and adapted to receive a fuel pump receptacle lid and closed completely at an opposite end and being free of any line connections at said opposite end and said fuel pump receptacle defining a hollow interior pump space, said unitary formed combination including a partitioning sidewall positioned between said main housing and said fuel pump receptacle and defining a flow passageway which connects said pump space with said filter space.

16. The fuel filter of claim 15 wherein said pump receptacle defines a fuel inlet passageway.

17. The fuel filter of claim 16 wherein said unitary formed combination is a casting.

18. The fuel filter of claim 17 wherein said unitary formed combination defines three return fuel ports in flow communication with said filter space.

19. The fuel filter of claim 18 wherein said unitary formed combination further defines a main fuel outlet, a diagnostic port, and a heater connector port.

20. The fuel filter of claim 15 wherein said unitary formed combination is a casting.

21. The fuel filter of claim 15 wherein said unitary formed combination defines three return fuel ports in flow communication with said filter space.

* * * * *